United States Patent [19]

Perrone, Jr. et al.

[11] Patent Number: 5,565,274
[45] Date of Patent: Oct. 15, 1996

[54] FIRE RATED FLOOR DOOR AND CONTROL SYSTEM

[75] Inventors: Jerome F. Perrone, Jr., Wallingford; Duane W. Hipp, Orange, both of Conn.

[73] Assignee: The Bilco Company, West Haven, Conn.

[21] Appl. No.: 525,820

[22] Filed: Sep. 8, 1995

Related U.S. Application Data

[62] Division of Ser. No. 386,925, Feb. 10, 1995.

[51] Int. Cl.$^6$ ..................... B32B 9/00
[52] U.S. Cl. ............. 428/457; 428/209; 428/245; 428/246; 428/285; 428/913; 428/920; 428/921; 427/173; 427/289; 521/163; 521/165
[58] Field of Search .................. 428/920, 921, 428/209, 248, 913, 245, 246, 251, 285, 249; 117/137, 136; 427/173, 289; 521/165, 163

[56] References Cited

U.S. PATENT DOCUMENTS

| | | | |
|---|---|---|---|
| 617,855 | 1/1899 | Dorr et al. | |
| 2,361,040 | 10/1944 | Larsen | 268/64 |
| 2,490,823 | 12/1949 | Manning | 60/51 |
| 2,618,365 | 11/1952 | Seagren | 188/96 |
| 2,949,894 | 8/1960 | Hewitt | 121/46 |
| 2,962,001 | 11/1960 | Morton et al. | 121/45 |
| 3,934,066 | 1/1976 | Murch | 428/248 |
| 4,074,527 | 2/1978 | Sadler | 60/632 |
| 4,268,007 | 5/1981 | Chittenden | 251/30 |
| 4,292,358 | 9/1981 | Fryer et al. | 428/135 |
| 4,367,295 | 1/1983 | von Bonin | 521/165 |
| 4,369,064 | 1/1983 | von Bonin | |
| 4,380,593 | 4/1983 | von Bonin et al. | 521/163 |
| 4,529,742 | 7/1985 | von Bonin et al. | 521/107 |
| 4,530,877 | 7/1985 | Hadley | 428/305 |
| 4,572,862 | 2/1986 | Ellis | 428/245 |
| 4,649,089 | 3/1987 | Thwaites | 428/913 |
| 4,699,822 | 10/1987 | Shu | 428/198 |
| 4,729,224 | 3/1988 | McAteer | 50/593 |
| 4,735,155 | 4/1988 | Johnson | 109/24 |
| 4,799,349 | 1/1989 | Luckanuck | 52/809 |
| 4,888,057 | 12/1989 | Nguyen et al. | 106/18.12 |
| 4,936,064 | 6/1990 | Gibb | 52/232 |
| 5,035,951 | 7/1991 | Dimanshteyn | 428/446 |
| 5,130,184 | 7/1992 | Ellis | 428/245 |
| 5,140,894 | 8/1992 | Snyder et al. | 91/4 |
| 5,155,959 | 10/1992 | Richards et al. | 52/455 |
| 5,245,879 | 9/1993 | McKeon | 47/2 |
| 5,305,901 | 4/1994 | Dennig | 220/1.5 |
| 5,338,349 | 8/1994 | Farrar | |

Primary Examiner—Patrick Ryan
Assistant Examiner—Abraham Bahta
Attorney, Agent, or Firm—DeLio & Peterson

[57] ABSTRACT

Horizontally hinged covers for use in ceiling/floors are provided which are highly fire resistant and which in the event of fire automatically close. The door preferably utilizes a multilayer construction comprising an intumescent lower (inner) layer, an intermediate structural layer and a top (outer) layer of a cementitious material. The horizontally hinged door utilizes an automatic closing system in the event of fire comprising a fusible link which activates a pressurized gas source to close the door and which pressurized gas source is automatically purged when the door is closed to prevent explosion of the pressurized gas source. The fusible link also actuates (opens) a hydraulic valve to allow the flow of hydraulic fluid from a pneumatic/hydraulic housing which is used with a movable rod to open and close the door.

18 Claims, 2 Drawing Sheets

FIRE RATED FLOOR DOOR AND CONTROL SYSTEM

This is a divisional of copending application Ser. No. 08/386,925 filed on Feb. 10, 1995, pending.

BACKGROUND OF THE INVENTION

1. Field of the Invention

This invention relates to a fire-resistant laminate structure and more particularly to horizontally hinged doors for floors, which doors have a high fire rating and which utilize a control system to automatically close the door in a fire.

2. Description of Related Art

The need for fire resistant structures is self-evident and building codes have been passed by government to ensure that public safety is protected. For many buildings and particularly multi-floor buildings it is mandatory to employ fire-resistant materials such as fireproof panels and to design the building to stop or impede the spread of fire and allow time for persons in the building to escape. Partitions, doors, floors, ceilings and the like are required to provide sufficient resistance to the path of a fire and a number of fireproofing techniques to enhance their resistance to fire have been used over the years as is well-known in the art. For convenience, the present description will be directed to horizontal doors for use in floors and, it will be appreciated that the invention can be used in any application where fire-resistance is needed.

Horizontally hinged doors are commonly used for access doors, roof scuttles, automatic fire vents, ceiling access doors, basement doors and for pit, floor and sidewalk doors for access to subterranean locations. In all cases, the doors are used to provide access from one location to another location such as through a floor in a building into a space between the floor and ceiling below. As is apparent, these openings are a safety hazard if a fire breaks out in one section of a building since the fire itself or its harmful byproducts can easily spread throughout the entire building by passing through the above-described openings. Further, such travel can occur irrespective of the fireproof qualities of the building structure components themselves since the fire is not contained. As a result, most fire codes now require that these openings be closed, and that they be closed with materials whose resistance to fire, heat and gases is at least equal to the resistance of the wall, floor, ceiling, or other structural components themselves.

While horizontal doors are known to provide automatic venting in the event of fire as for example where the door provides roof access, it is necessary that horizontal floor doors used in the buildings be automatically closed in the event of fire to contain the fire to a particular floor or location and to prevent the fire from spreading to other floors or areas in the building.

In floor door assemblies, it is highly desirable that a two (2) hour fire rating per ASTM E 119 be achieved to prevent the effect of a fire on the floor below from causing fire damage to the floor above. While the floor door assembly must be capable of being easily opened or closed to provide access, it is essential in the event of fire that the door be automatically closed to contain the fire.

U.S. Pat. No. 4,888,057 describes a structure composed of an aluminum sheet and a multi-layer inorganic intumescent coating. There is no concrete layer. U.S. Pat. No. 4,799,349 describes a steel door with a high density bonded mineral fiber sheet as a core. The bonding material between the mineral sheet and the core is provided by an intumescent binder. There is no concrete layer involved. U.S. Pat. No. 4,699,822 describes an improvement on a prior art method of coating steel with hydraulic cement to protect it from the weakening effects of high heat. No intumescent coating is described. U.S. Pat. Nos. 4,936,064 and 5,305,901 show miscellaneous fireproof items, including a fireproof panel and a fireproof container. U.S. Pat. No. 4,292,538 describes an expanded metal mesh coated with an intumescent coating. There is no concrete involved in this fire proof material. U.S. Pat. No. 4,530,877 issued to Von Bonin et al. on Apr. 19, 1993, describes a building panel employing an intumescent coating. Exemplary intumescent coatings are shown in U.S. Pat. Nos. 4,575,862, 5,035,951; 5,338,349; 4,529,742; 4,380,593; 4,369,064; and 4,367,295. All of the above patents are incorporated herein by reference.

Bearing in mind the problems and deficiencies of the prior art, it is one object of the present invention to provide an improved fire retardant structural article of manufacture.

It is another object of the invention to provide a door assembly such as a horizontal door assembly which automatically closes in a fire or other emergency.

It is a further object of the invention to provide a control system for automatically closing doors or other openings in a fire or other emergency.

Still other objects and advantages of the invention will in part be obvious and will in part be apparent from the specification.

SUMMARY OF THE INVENTION

The present invention provides a fire proof laminate structure comprising a first layer of intumescent material, a second intermediate layer comprising a structural material such as metal or plastic and a third layer comprising a cementitious material. The intumescent material on being exposed to fire chars and forms a highly insulating layer which protects the adjacent structural material layer. The cementitious material layer acts as a thermal barrier and insulator and the heat that penetrates the structural material layer is further dissipated by steam produced from water in the cement. The laminate structure maintains the upper cementitious surface of the structure at a low temperature for a relatively long period of time.

The characteristic feature of intumescent coatings is that the intumescent composition, upon exposure to heat or flame, swells or puffs up to a relatively thick cellular foam char which possesses heat-insulative and fire-retardant properties. The heat or flame activated reaction causes the intumescent materials to foam and expand into thick cellular form char and generate inert gases such as nitrogen, carbon dioxide, etc., which are entrapped in the foam and thus prevent the access of air and oxygen to the combustible substrate. This swelled cellular, generally carbonaceous, char layer which adheres to the substrate expands to many times the thickness of the original coating and thus effectively insulates the substrate from heat and serves as an effective oxygen barrier. Any intumescent composition such as described hereinabove can be employed in the invention.

The metal or other structural material intermediate layer may be selected from a wide variety of materials such as steel, aluminum, plastic and the like.

The third layer is of cementitious materials with the cementitious materials being those usually used to make fire rated decks. Inorganic materials, such as Portland cement, gypsum, calcium aluminate cement, phosphate-bonded cement, and magnesium "oxycholoride" and magnesium "oxysulphate" cements may be used. The doors are generally sold without the cementitious layer and are layered with the cementitious material at the job site (poured at the site) where the door is being installed. The cement layer on the door will usually be the same cement used to construct the floor in which the door is being installed. Hydraulic cement based compositions comprising an inorganic hydraulic cement binder component such as Portland cement are generally used. Compositions of this type are described in U.S. Pat. Nos. 3,369,929; 3,719,513; and 3,839,059, which patents are incorporated herein by reference The present invention also provides a hinged door assembly for enclosing an opening such as in a floor (a horizontal door) which door in the event of fire will, if in the open position, automatically close, or stays closed if in the closed position and which will automatically vent a pressurized gas source comprising:

a. a frame which fits into and is secured in the opening;

b. a door hingedly mounted to the frame for motion between an open and closed position;

c. a hydraulic/pneumatic housing having an axially movable rod and connected piston therein which forms a hydraulic chamber and la pneumatic chamber in the housing with the end of the rod not connected to the piston extending from an end of the housing with the end of the extended rod pivotally attached to the door, and the housing, preferably at the other end of the housing, pivotally attached to the frame to allow movement of the housing and rod during opening and closing of the door;

d. a hydraulic fluid source such as oil connected to the hydraulic chamber of the housing, the connection having a check valve to prevent flow through the connection from the housing to the fluid source;

e. a pneumatic valve connected to the pneumatic chamber of the housing and connected to a pressurized source activating means and having a vent position which allows a gas flowing into or out of the pneumatic chamber to be connected to the atmosphere, the pneumatic valve having a first actuating means for setting the pneumatic valve position, the first actuating means preferably being a first extendible valve member which is in an unextended position when the door is closed or in a non-emergency situation;

f. a hydraulic valve connected to the hydraulic chamber of the housing and to the hydraulic fluid source, the hydraulic valve having a second actuating means for setting the hydraulic valve position, the second actuating means preferably being a second extendible valve member which is in unextended position when the door is closed and remains in the unextended position unless manually extended;

g. a second hydraulic valve connected to the hydraulic chamber of the housing and to the hydraulic fluid source;

h. a heat sensing or heat actuating means such as a fusible link temperature sensor or other sensing or actuating means connected to the pressurized source activating means and to the second hydraulic valve; and i. a pressurized pneumatic source connected to the pressurized source activating means wherein when a fire starts and the door is open the heat sensing or actuating means opens the second hydraulic valve and actuates the pressurized source actuating means supplying a pressurized gas from the pressurized pneumatic source to the pneumatic valve actuating the first actuating means to position the valve so that the vent is closed and the gas is directed into the pneumatic chamber of the housing forcing the hydraulic fluid in the hydraulic chamber of the housing through the second hydraulic valve into the hydraulic fluid source and thereby closing the door, wherein when the door is closed the first actuating means is actuated to position the pneumatic valve so that the vent is opened.

In another aspect of the invention, a control system is provided for automatically closing a door in a fire wherein the door comprises a frame, a door hingedly mounted to the frame, a hydraulic/pneumatic housing pivotally mounted to the frame and having an axially movable piston and connected rod in the housing forming a pneumatic chamber and a hydraulic chamber with the rod extending from the frame and the extending end of the rod being pivotally connected to the door, a hydraulic fluid source, a pneumatic valve having a first actuating means and a vent to the atmosphere, a hydraulic valve having a second actuating means, a second hydraulic valve, a heat sensing or heat activating means, a pressurized source activating means, and a pressurized pneumatic source comprising activating the heat sensing means by the fire which opens the second hydraulic valve and actuates the pressurized actuating means supplying a pressurized gas from the pressurized pneumatic source to the pneumatic valve, which pressurized gas actuates the first actuating means of the pneumatic valve to position the valve to close the vent and direct the gas to the pneumatic chamber of the housing closing the door wherein the oil in the hydraulic chamber of the housing is directed to the oil source through the second hydraulic valve and when the door is closed the first actuating means of the pneumatic valve is actuated to position the pneumatic valve to open the vent.

In yet another aspect of the invention, a control system is provided to provide automatic movement of a structure such as a sliding door, building panels, fire shutters, security grills, and the like comprising: a structure frame, a movable member attached to the frame, a hydraulic/pneumatic housing pivotally mounted to the frame or movable member and having an axially movable; piston and connected rod in the housing forming a pneumatic chamber and a hydraulic chamber with the rod extending from the frame and the extending erred of the rod being pivotally connected to the other member, e.g., movable member or frame, a hydraulic fluid source, a pneumatic valve having a first actuating means and a vent to the atmosphere, a hydraulic valve having a second actuating means, a second hydraulic valve, a heat sensing or heat activating means, a pressurized source activating means, and a pressurized pneumatic source comprising activating the heat sensing means by the fire which opens the second hydraulic, valve and actuates the pressurized actuating means supplying a pressurized gas from the pressurized pneumatic source to the pneumatic valve, which pressurized gas actuates the first actuating means of the pneumatic valve to position the valve to close the vent and direct the gas to the pneumatic chamber of the housing closing the movable member wherein the oil in the hydraulic chamber of the housing is directed to the oil source through the second hydraulic valve and when the movable member is closed the first actuating means of the pneumatic valve is actuated to position the pneumatic valve to open the vent.

In another aspect of the invention when the door or other movable member is to be closed manually, the second actuating means of the hydraulic valve is actuated to open the hydraulic valve and when the door is manually closed, the hydraulic fluid is forced from the hydraulic chamber of the housing through the hydraulic valve into the hydraulic fluid source. Air is drawn into pneumatic chamber 13 through vent 15a and line 15.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
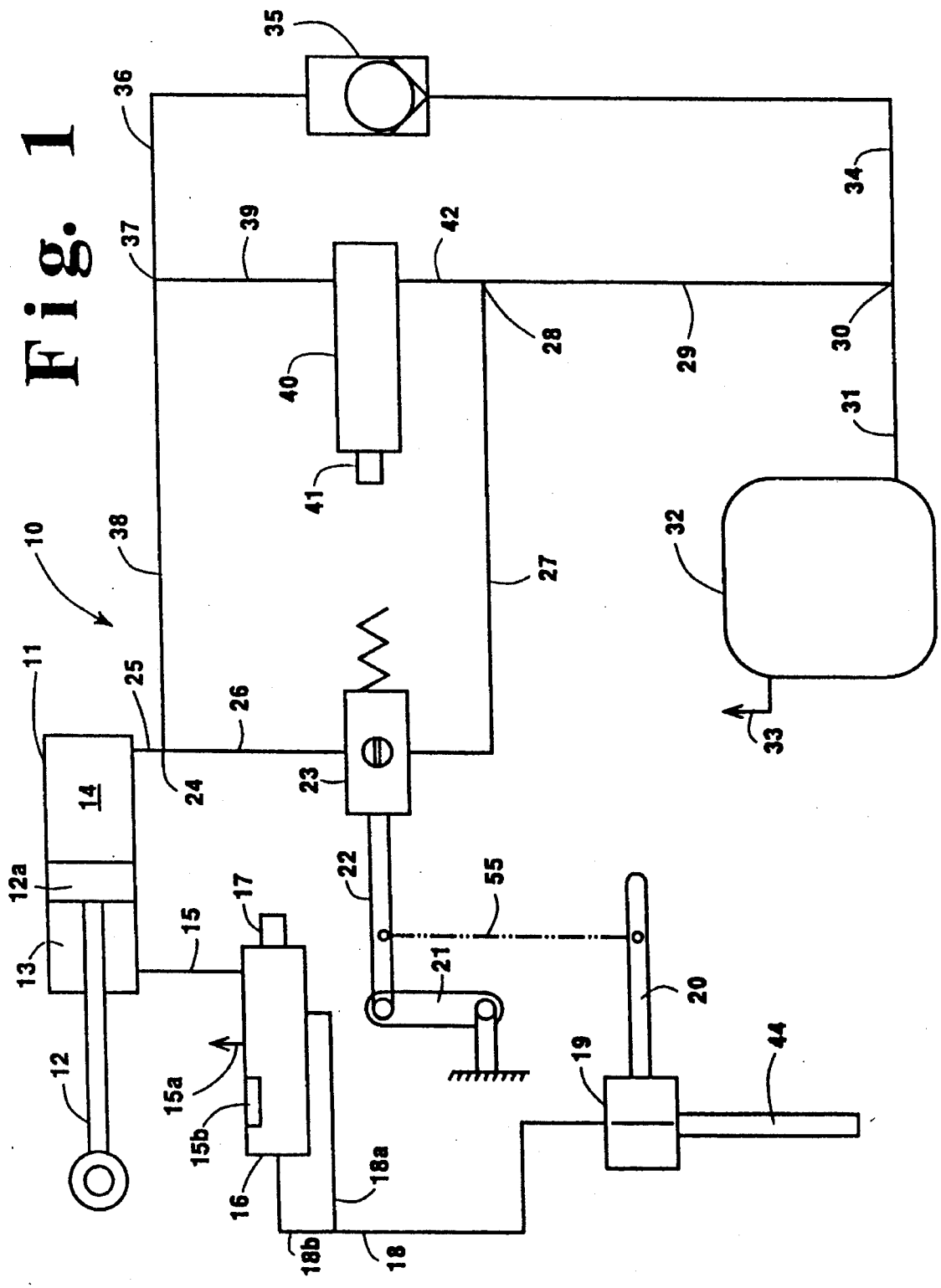
FIG. 1 is a schematic diagram of the preferred automatic door closing control system of the present invention.

In describing the preferred embodiment of the present invention, reference will be made herein to FIGS. 1–3 of the drawings in which like numerals refer to like features of the invention. Features of the invention are not necessarily shown to scale in the drawings.

The preferred embodiment of the control system of the invention 10 is shown in FIG. 1. The operation of the control system will be described with relation to the essentially 4 operating situations which would usually be encountered during use of the door: 1) the door is opened manually; 2) the open door is closed manually; 3) the door is closed and a fire starts; and 4) the door is open and a fire starts.

When the door is closed and to be opened manually the door which preferably has a latching mechanism is unlatched. When the door is in the closed position, valve member 41 of the hydraulic (oil) valve 40 and valve member 17 of the pneumatic valve 16 are in their unextended (closed) position. In the unextended position hydraulic valve 40 is closed to flow therethrough and pneumatic valve 16 would vent through 15a a gas coming into the valve from pneumatic chamber 13 through line 15 or allow a gas to enter through the vent 15a into pneumatic chamber 13 through line 15. Line 18 is branched and lines 18a and 18b are both connected to valve 16. Pneumatic valve 16 is preferably a conventional 4-way, 5-port, detented, pilot operated directional control valve with panel mount button, Model #18PMOP-4-way, made by Fabco, Inc. Hydraulic valve 40 is preferably a conventional 2-way 2-position valve. When the unlatched door is opened manually, rod 12 and piston 12a moves axially outward from housing 11 drawing oil from tank 32 into hydraulic chamber 14 through lines 31, 34, check valve 35, 36, 38 and 25. Air, $CO_2$ or other gas in pneumatic chamber 13 is forced out of chamber 13 through line 15 and vented in line 15a from pneumatic valve 16. The door is now open and held in that position by housing 11, rod 12 and check valve 35 which prevents the flow of oil into tank 32. In the manual, non-emergency mode, valve member 17 stays in the unextended position whether the door is open or closed and vent 15a is always open.

To shut the open door manually, valve 40 is opened by extending (pulling out) valve member 41 of valve 40 thereby opening the valve to permit the flow of oil therethrough. When the door is pulled closed rod 12 is retracted into cylinder housing 11 forcing oil from chamber 14 by the motion of piston 12a. The oil flows through lines 25, 38, 39, valve 40, 42, 29 and 31 into oil tank 32. Air or other gas in pneumatic chamber 13 is drawn into the chamber through vent 15a and line 15. When the door is in the closed position valve member 41 of valve 40 is forced into its unextended position thereby closing valve 40. Valve member 17 stays in the unextended position whether the door is open or closed in a non-emergency situation and valve 16 is always positioned for venting.

In the situation where the door is closed and latched and a fire starts, when sufficient heat is generated fusible link 21 is broken actuating (opening) spring deadman ball valve 23 and puncturing $CO_2$ cartridge 44 by the action of members 20 and 22 and connecting cable 55. Generally, the spring of valve 23 forces the valve open when the fusible link is melted. Any pressurized gas source may be used, e.g., air. Puncture mechanism 19 is actuated by member 20 and is a conventional mechanism wherein a $CO_2$ cartridge 44 is screwed into the puncture mechanism and is punctured when actuated. Pressurized $CO_2$ from tank 44 flows through puncture mechanism 19, and line 18 (18a and 18b) into valve 16 where it is vented to the atmosphere e.g., by rupturing a disk 15b or venting through a valve. $CO_2$ tank 44 will be completely purged and not pose any explosive threat due to the fire. Valve member 17 cannot be extended by the gas pressure since it rests against a stop and the door can not open because it is in the latched position by the door's manual latching mechanism. When the gas is purged, the door may be opened manually as in a non-emergency situation. It is highly preferred that a rupture disk 15b be used in the pneumatic valve 16 to purge the gas source. A rupture disk may also be used at any point in the pressurized line, such as in 18, 18a or 18b. The rupture disk is sized to rupture at a pressure which would be reached at an elevated temperature as that which would occur in a fire.

In the situation where the door is in the open position and a fire starts, valve 40 is in the closed position and valve 16 in the vent position because valve members 41 and 17 are in their usual unextended positions. When the fire breaks fusible link 21 ball valve 23 is opened and the $CO_2$ cartridge 44 is punctured by puncture mechanism 19 by the action of members 20 and 22 and connecting cable 55. Pressurized $CO_2$ flows from tank 44 through puncture mechanism 19 and line 18 (18a and 18b) and into valve 16 and the $CO_2$ pressure in line 18b forces valve member 17 to the extended position. In the extended position vent 15a of valve 16 is closed and the $CO_2$ flows into pneumatic chamber 13 through line 15 forcing oil from hydraulic chamber 14 and retracting rod 12 and piston 12a closing the door. The oil from chamber 14 flows through lines 25, 26, second hydraulic valve 23, 27, 29 and 31 to oil tank 32. Hydraulic valve 40 could be in either the opened (extended position) or closed (unextended) position. When the door is closed valve member 41 of valve 40 and valve member 17 of valve 16 will be forced into their unextended positions. In the unextended position valve member 17 positions valve 16 so that vent vent 15a is open and $CO_2$ entering valve 16 will be purged when the rupture disk 15b is ruptured. The door may now be opened manually as in a non-emergency situation. Tees 24, 28, 30 and 37 are used to facilitate connecting the various lines.

Figure 2:
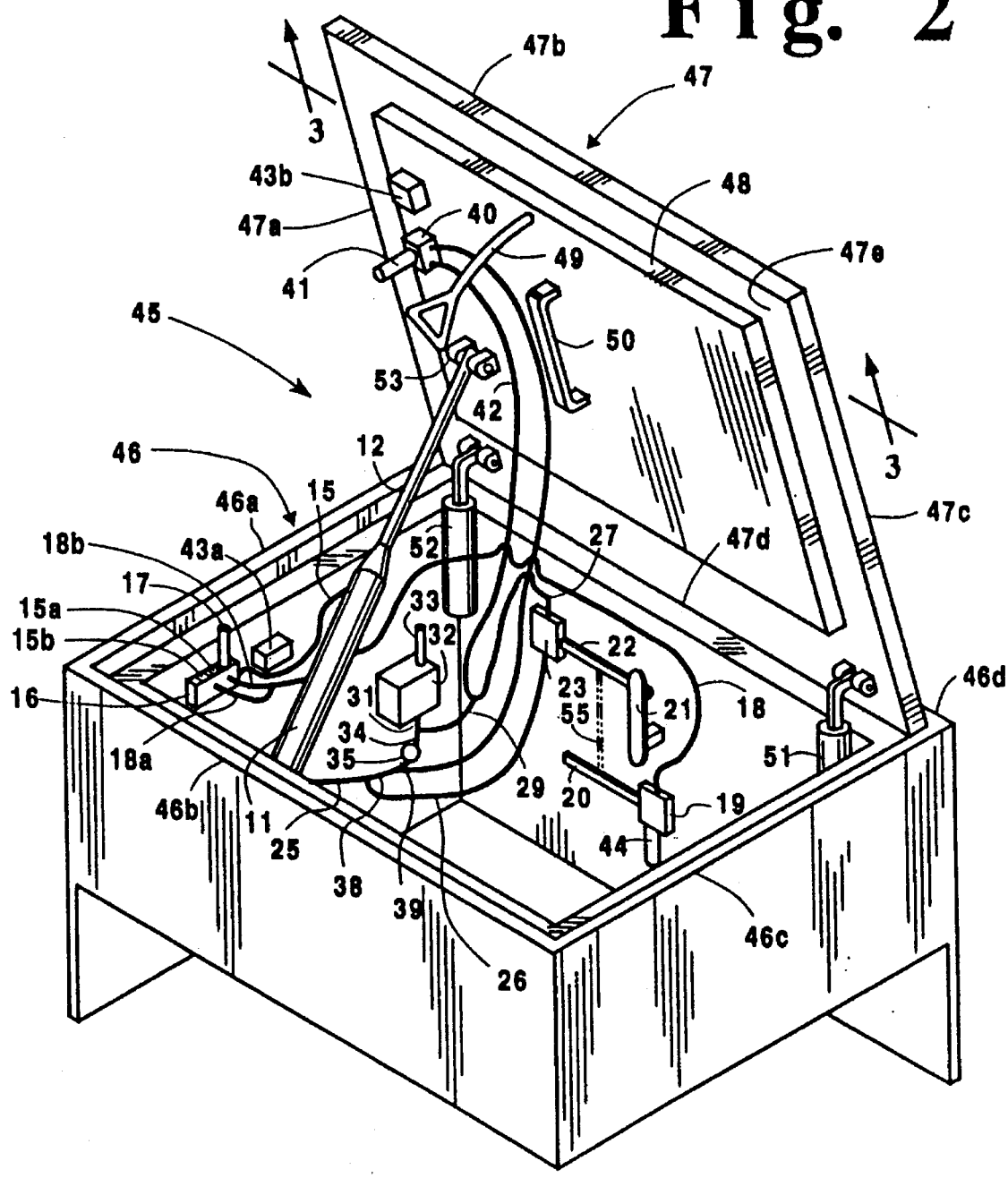
FIG. 2 is a perspective view of a horizontal door of the invention in the open position.

With regard to FIG. 2, a door assembly for enclosing an opening in a floor according to the present invention is generally indicated by reference 45. The door assembly is shown having a frame 46 comprising sides 46a, 46b, 46c and 46d. The door is shown as 47 and has sides 47a, 47b, 47c and 47d and bottom layer 47e. The door 47 has an intumescent coating 48. Intumescent coatings can also be applied to the inside wall sides 46a, 46b, 46c and 46d. The door also has a latching mechanism (not shown) which automatically latches the door when the door is closed. The door may be unlatched by pulling cable 49. Handle 50 is used for manually opening and closing the door. Conventional hydraulic or spring actuated cylinders 51 and 52 provide lift to open the door. A number of such cylinders can be used depending on the application. The control system of FIG. 1 is shown in FIG. 2. The position of the various valves, hoses, $CO_2$ tank and oil supply tank may be varied depending on the use of the door. Ball valve 23, puncturing mechanism 19, fusible link 21, connecting members 20 and 22 and cable 55 are preferably positioned near $CO_2$ tank 44. Tank 44 is shown screwed into puncture mechanism 19.

As can be seen in FIG. 2, hydraulic valve 40 and pneumatic valve 16 are positioned so that when door 47 is closed in frame 46 valve members 41 and 17 are forced to their unextended positions by stops 43a and 43b, respectively, thereby closing valve 40 and positioning valve 16 to the vent position (opening vent 15a). Cylinder housing 11 and rod 12 are pivotally mounted to frame 46 (not shown) and door 47 (by member 53) respectively to allow movement of the housing and rod when door 47 is opened or closed. Likewise, door cylinders 51 and 52 are pivotally mounted to allow movement when the door is being opened or closed.

When door 47 is manually closed valve 40 is opened by extending valve member 41 and handle 50 is pulled to close the door or the door is simply pushed close. When the door is closed the door is preferably automatically latched. To unlatch the door cable 49 is pulled. Latching of the door prevents the door from being opened unless manually unlatched.

Figure 3:
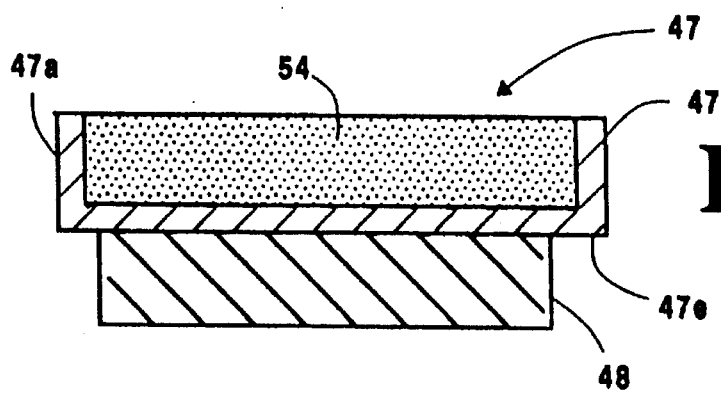
FIG. 3 is a cross-sectional view along the line 3—3 in FIG. 2 showing the multilayer laminate construction of the fireproof door or other such structural member of the invention.

FIG. 3 is a cross-sectional view of a preferred door 47 of the invention and shows door 47 being constructed in a pan type design having sides 47a and 47c and base layer 47e and wherein there is a recess for filling with the cementitious material. In general, the pan is usually about 1 inch deep and could be up to 2 inches deep or more. The pan may be filled to any depth and then covered to grade with, e.g., carpet. Usually, cement at least ½ inch deep is needed to meet the fire codes. The intumescent coating 48 is shown adjacent to the lower side 47e of door 47 and a cementitious material 54 is enclosed within the vertical wall sections of the pan shape door frame. The intumescent coating is usually multilayer and is sprayed onto the intermediate layer. Usually, at least a ⅝ inch thickness is used up to about 1 inch. A preferred intumescent material is ALBI CLAD 900 sold by Albi Manufacturing, East Berlin, Conn. and the preferred metal is aluminum. In this particular design, if a fire starts, the fire will contact intumescent coating 48 to char it and the coating then provides an insulating effect. If the fire lasts long enough, metal frame 47 will become heated and eventually cementitious layer 54 will become heated. This design provides enhanced heat insulating effects due to the combined effect of the intumescent layer and the cementitious layer which cementitious layer when heated dissipates heat due to the production of steam from water in the cement.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A fire proof article of manufacture comprising a first layer of intumescent material, which material upon exposure to heat or flame swells or puffs up to a relatively thick cellular foam char which possesses heat-insulative and fire-retardant properties, a second intermediate layer comprising a structural material and a third layer comprising a cementitious material.

2. The article of claim 1 wherein the intermediate layer is metal.

3. The article of claim 2 wherein the intermediate layer is aluminum.

4. The article of claim 3 wherein the cementitious material is hydraulic cement.

5. The article of claim 4 wherein the article is a door.

6. The article of claim 5 wherein the door is a horizontal door.

7. The article of claim 4 wherein the article is a partition.

8. The article of claim 1 wherein the structural material is plastic.

9. The article of claim 8 wherein the cementitious material is hydraulic cement.

10. The article of claim 9 wherein the article is a door.

11. The article of claim 10 wherein the door is a horizontal door.

12. The article of claim 9 wherein the article is a partition.

13. A horizontally hinged fire proof door comprising a first layer of intumescent material, which material upon exposure to heat or flame swells or puffs ups to a relatively thick cellular foam char which possesses heat-insulative and fire-retardant properties, a second intermediate layer comprising a structural material and a third upper layer comprising a cementitious material.

14. The horizontally hinged fire proof door of claim 13 wherein the structural material is metal.

15. The horizontally hinged fire proof door of claim 14 wherein the structural material is aluminum.

16. The horizontally hinged fire proof door of claim 15 wherein the cementitious material is hydraulic cement.

17. The horizontally hinged fire proof door of claim 13 wherein the structural material is plastic.

18. The horizontally hinged door of claim 17 wherein the cementitious layer is hydraulic cement.

* * * * *

UNITED STATES PATENT AND TRADEMARK OFFICE
CERTIFICATE OF CORRECTION

PATENT NO. : 5,565,274

DATED : October 15, 1996

INVENTOR(S) : Perrone, Jr., et al.

Page 1 of 2

It is certified that error appears in the above-indentified patent and that said Letters Patent is hereby corrected as shown below:

The title page should be deleted and substitute therefor the attached title page.

Column 3, line 12: add - - . - - at the end of the sentence.

Column 3, line 25: "la" should read as - - a - - .

Column 4, line 45: "erred" should read as - - end - - .

Column 6, line 55: "dosed" should read as - - closed - - .

Column 6, line 60: delete "vent".

Column 7, line 10: "dosing" should read as - - closing - - .

IN THE CLAIMS:

Claim 13, column 8, line 42: "ups" should read as - - up - - .

Signed and Sealed this

Twenty-first Day of January, 1997

Attest:

BRUCE LEHMAN

*Attesting Officer*   *Commissioner of Patents and Trademarks*

United States Patent [19]

Perrone, Jr. et al.

[11] Patent Number: 5,565,274
[45] Date of Patent: Oct. 15, 1996

[54] FIRE RATED FLOOR DOOR AND CONTROL SYSTEM

[75] Inventors: Jerome F. Perrone, Jr., Wallingford; Duane W. Hipp, Orange, both of Conn.

[73] Assignee: The Bilco Company, West Haven, Conn.

[21] Appl. No.: 525,820

[22] Filed: Sep. 8, 1995

Related U.S. Application Data

[62] Division of Ser. No. 386,925, Feb. 10, 1995.

[51] Int. Cl.$^6$ ............................ B32B 9/00
[52] U.S. Cl. ................... 428/457; 428/209; 428/245; 428/246; 428/285; 428/913; 428/920; 428/921; 427/173; 427/289; 521/163; 521/165
[58] Field of Search .................. 428/920, 921, 428/209, 248, 913, 245, 246, 251, 285, 249; 117/137, 136; 427/173, 289; 521/165, 163

[56] References Cited

U.S. PATENT DOCUMENTS

| Number | Date | Inventor | Class |
|---|---|---|---|
| 617,855 | 1/1899 | Dorr et al. | |
| 2,361,040 | 10/1944 | Larsen | 268/64 |
| 2,490,823 | 12/1949 | Manning | 60/51 |
| 2,618,365 | 11/1952 | Seagren | 188/96 |
| 2,949,894 | 8/1960 | Hewitt | 121/46 |
| 2,962,001 | 11/1960 | Morton et al. | 121/45 |
| 3,934,066 | 1/1976 | Murch | 428/248 |
| 4,074,527 | 2/1978 | Sadler | 60/632 |
| 4,268,007 | 5/1981 | Chittenden | 251/30 |
| 4,292,358 | 9/1981 | Fryer et al. | 428/135 |
| 4,367,295 | 1/1983 | von Bonin | 521/165 |
| 4,369,064 | 1/1983 | von Bonin | |
| 4,380,593 | 4/1983 | von Bonin et al. | 521/163 |
| 4,529,742 | 7/1985 | von Bonin et al. | 521/107 |
| 4,530,877 | 7/1985 | Hadley | 428/305 |
| 4,572,862 | 2/1986 | Ellis | 428/245 |
| 4,649,089 | 3/1987 | Thwaites | 428/913 |
| 4,699,822 | 10/1987 | Shu | 428/198 |
| 4,729,224 | 3/1988 | McAteer | 50/593 |
| 4,735,155 | 4/1988 | Johnson | 109/24 |
| 4,799,349 | 1/1989 | Luckanuck | 52/809 |
| 4,888,057 | 12/1989 | Nguyen et al. | 106/18.12 |
| 4,936,064 | 6/1990 | Gibb | 52/232 |
| 5,035,951 | 7/1991 | Dimanshteyn | 428/446 |
| 5,130,184 | 7/1992 | Ellis | 428/245 |
| 5,140,894 | 8/1992 | Snyder et al. | 91/4 |
| 5,155,959 | 10/1992 | Richards et al. | 52/455 |
| 5,245,879 | 9/1993 | McKeon | 47/2 |
| 5,305,901 | 4/1994 | Dennig | 220/1.5 |
| 5,338,349 | 8/1994 | Farrar | |

Primary Examiner—Patrick Ryan
Assistant Examiner—Abraham Bahta
Attorney, Agent, or Firm—DeLio & Peterson

[57] ABSTRACT

Horizontally hinged covers for use in ceiling/floors are provided which are highly fire resistant and which in the event of fire automatically close. The door preferably utilizes a multilayer construction comprising an intumescent lower (inner) layer, an intermediate structural layer and a top (outer) layer of a cementitious material. The horizontally hinged door utilizes an automatic closing system in the event of fire comprising a fusible link which activates a pressurized gas source to close the door and which pressurized gas source is automatically purged when the door is closed to prevent explosion of the pressurized gas source. The fusible link also actuates (opens) a hydraulic valve to allow the flow of hydraulic fluid from a pneumatic/hydraulic housing which is used with a movable rod to open and close the door.

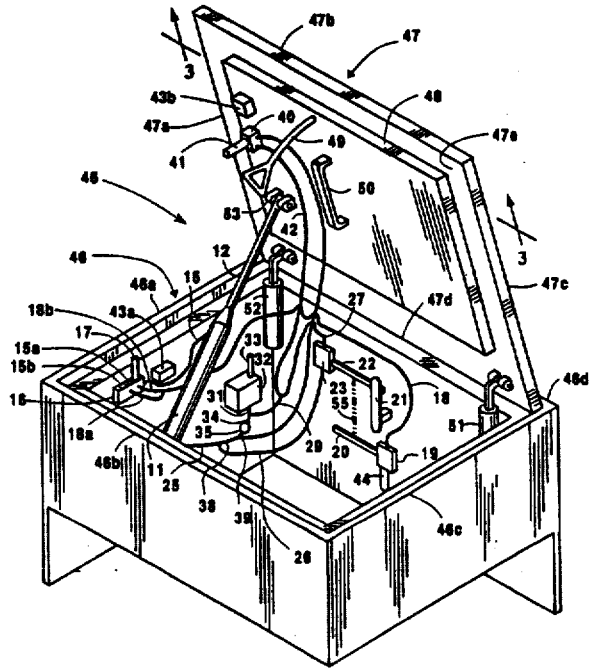

18 Claims, 2 Drawing Sheets